United States Patent [19]

Freese et al.

[11] Patent Number: 5,518,630

[45] Date of Patent: May 21, 1996

[54] METHOD FOR CONTROLLING SCALE FORMATION AND DEPOSITION

[75] Inventors: Donald T. Freese, Glenside; Libardo A. Perez, Morrisville, both of Pa.

[73] Assignee: Betz Laboratories, Inc., Trevose, Pa.

[21] Appl. No.: 384,990

[22] Filed: Feb. 7, 1995

Related U.S. Application Data

[63] Continuation-in-part of Ser. No. 215,982, Mar. 22, 1994, abandoned.

[51] Int. Cl.$^6$ ........................................... C02E 5/10
[52] U.S. Cl. ........................ 210/698; 210/701; 252/180
[58] Field of Search .................................. 210/698–701; 252/180

[56] References Cited

U.S. PATENT DOCUMENTS

| | | | |
|---|---|---|---|
| 3,898,037 | 8/1975 | Lange et al. | 210/701 |
| 4,303,568 | 12/1981 | May et al. | 260/29.6 MP |
| 4,618,448 | 10/1986 | Cha et al. | 252/180 |
| 4,659,481 | 4/1987 | Chen | 210/697 |
| 4,936,987 | 6/1990 | Persinski et al. | 210/699 |
| 4,978,456 | 12/1990 | Sprague | 210/701 |

*Primary Examiner*—Peter A. Hruskoci
*Attorney, Agent, or Firm*—Alexander D. Ricci; Richard A. Paikoff

[57] ABSTRACT

A method and composition for controlling the formation and deposition of scale imparting compounds in an aqueous system is disclosed. A treatment comprising a sulfonated polymer and a polymaleic acid is effective in controlling the formation and deposition of such compounds.

8 Claims, No Drawings

METHOD FOR CONTROLLING SCALE FORMATION AND DEPOSITION

This is a continuation-in-part of application Ser. No. 08/215,982 filed Mar. 22, 1994 now abandoned.

FIELD OF THE INVENTION

The present invention pertains to a composition and method of utilization of same to control the formation and deposition of scale imparting compounds in water systems such as cooling, boiler and gas scrubbing systems.

BACKGROUND OF THE INVENTION

The problems associated with scale formation have troubled water systems for years. Scale tends to accumulate on internal walls of various water systems, such as boiler and cooling systems, and thereby materially lessens the operational efficiency of the system.

Deposits in lines, heat exchange equipment, etc., may originate from several causes. For example, precipitation of calcium carbonate, calcium sulfate and calcium phosphate in the water systems leads to an accumulation of these scale imparting compounds along or around the metal surfaces which contact the flowing water circulating through the system. In this manner, heat transfer functions of the particular system are severely impeded.

Typically, in cooling water systems, the formation of calcium sulfate, calcium phosphate and calcium carbonate, among others, has proven deleterious to the overall efficiency of the cooling water system. Recently, due to the popularity of cooling treatments using high levels of orthophosphate to promote passivation of the metal surfaces in contact with the system water, it has become critically important to control calcium phosphate crystallization so that relatively high levels of orthophosphate may be maintained in the system to achieve the desired passivation without resulting in fouling or impeded heat transfer functions which would normally be caused by calcium phosphate deposition.

Although steam generating systems are somewhat different from cooling water systems, they share a common problem in regard to deposit formation.

As detailed in the Betz Handbook of Industrial Water Conditioning, 8th Edition, 1980, Betz Laboratories, Inc., Trevose, Pa. pages 85–96, the formation of scale and sludge deposits on boiler heating surfaces is a serious problem encountered in steam generation. Although current industrial steam producing systems make use of sophisticated external treatments of the boiler feedwater, e.g., coagulation, filtration, softening of water prior to its feed into the boiler system, these operations are only moderately effective. In all cases, external treatment does not in itself provide adequate treatment since mud, sludge, silts and hardness-imparting ions escape the treatment, and eventually are introduced into the steam generating system.

In addition to the problems caused by mud, sludge or silts, the industry has also had to contend with boiler scale. Although external treatment is utilized specifically in an attempt to remove calcium and magnesium from the feedwater, scale formation due to residual hardness, i.e., calcium and magnesium salts, is always experienced. Accordingly, internal treatment, i.e., treatment of the water fed to the system, is necessary to prevent, reduce and/or retard formation of the scale imparting compounds and their resultant deposition. The carbonates of magnesium and calcium are not the only problem compounds as regards to scale, but also waters having high contents of phosphate, sulfate and silicate ions either occurring naturally or added for other purposes cause problems since calcium and magnesium, and any iron or copper present, react with each and deposit as boiler scale. As is obvious, the deposition of scale on the structural parts of a steam generating system causes poorer circulation and lower heat transfer capacity, resulting accordingly in an overall loss in efficiency.

Polymaleic acid is known to be a calcium carbonate inhibitor. One of the problems with polymaleic acid is that when it is added to aqueous solutions to prevent calcium carbonate precipitation, it tends to precipitate out with calcium. This reduces the concentration of polymaleic acid (PMA) and also can cause fouling with calcium:PMA deposits.

DETAILED DESCRIPTION OF THE INVENTION

In accordance with the invention, it has been surprisingly discovered that a combination of polymaleic acid and a sulfonated acrylic acid copolymer is effective in controlling the formation of mineral deposits in various water systems. The addition of sulfonated acrylic acid copolymer, e.g., acrylic acid/allyl hydroxypropyl sulfonate ether (AA/AHPSE, or Polymer A) prevents PMA from precipitating out with the calcium. Also, the addition of the copolymer improved the calcium carbonate scale controllability of PMA. It is expected that any sulfonated polymer (copolymer, terpolymer, etc.) would provide the same benefit to PMA. Also, other polymaleic acid polymers would also be expected to be improved with sulfonated copolymers. Furthermore, it is anticipated that other copolymers, such as acrylic acid/2-acrylamido-2-methylpropylsulfonic acid or 2-acrylamido-2-methylsulfonic acid and PMA would provide the same benefits to PMA, namely preventing PMA from precipitating out with calcium, and improving calcium carbonate scale controllability of PMA.

The following data indicate the precipitation of PMA with soluble calcium in aqueous solutions:

| Treatment | Turbidity (NTU) at ppm active treatment | | | | | | | |
|---|---|---|---|---|---|---|---|---|
| | 0 | 10 | 15 | 20 | 25 | 30 | 35 | 40 |
| PMA | 0.2 | 0.6 | 0.8 | 1.2 | 1.5 | 2.2 | 2.6 | 2.9 |

The increasing turbidity indicates precipitation of calcium: PMA. The tests were conducted under the following conditions: 500 ppm Ca as $CaCO_3$, pH 9.0 and 158° F. The pH was controlled with 0.01M sodium borate. The turbidity was measured according to standard procedures.

The improvement in the calcium tolerance of PMA with AA/AHPSE copolymer is demonstrated with a similar test. A 0.01M $CaCl_2.2H_2O$ solution was titrated with 0.01M NaOH. The higher the pH where precipitation first occurs indicates a more calcium tolerant treatment. The tests were conducted at 120° F. The pHs were measured with a Corning pH meter equipped with a Thomas Ag/AgCl combination electrode. The pH at which precipitation occurred was the first detectable increase in absorbance detected with a Brinkman PC 600 colorimeter. The initial pH of the solutions with the treatments was pre-adjusted to a pH of 4. The following data were generated:

TABLE 1

| Test No. | Treatment | ppm active | Treatment | ppm active | pH at which precipitation was first detected |
|---|---|---|---|---|---|
| 1 | PMA | 100 | — | — | 8.3–8.5 |
| 2 | PMA | 100 | — | — | 8.4–8.6 |
| 3 | PMA | 100 | AA/AHPSE | 100 | no precipitation to pH 9.9 where titration was stopped |

Recirculator tests are used to simulate heat transfer conditions in cooling systems. The recirculator test units have been used to demonstrate the improved inhibition of calcium carbonate deposits with PMA and AA/AHPSE blends. These units have a volume of approximately 11 liters and use a pump to generate water flow past the outside of an admiralty brass metal tube that contains a heater. The units have a temperature control device to maintain a desired sump temperature. The pH is maintained by the controlled addition of $CO_2$ to the system. Two makeup solutions are fed simultaneously to the units in order to maintain the specified water composition. The system volume is controlled by an overflow port. One makeup solution contains calcium chloride and magnesium sulfate while the other makeup tank contains sodium bicarbonate and sodium silicate.

Three recirculator tests were completed with the following physical characteristics:

pH 8.5

120° F. sump temperature 308 watts on the heater (at 13,000 BTU/HR/FT$^2$ heat flux)

2.8 ft/sec water velocity past the heated metal tubes 1.4 day retention time for 75% depletion The composition of the test water in these tests was: 600 ppm Ca as $CaCO_3$, 150 ppm Mg as $CaCO_3$, 210 ppm M alk as $CaCO_3$, 425 ppm Cl, 447 ppm $SO_4$, 244 ppm Na and 51 ppm $SiO_2$.

The following table illustrates the treatments and the results of the 7 day tests. All of the tests contain 3 ppm tolyltriazole to control admiralty brass corrosion.

TABLE 2

| Treatment | Tube Condition | Sump Turbidity | Sump Deposits |
|---|---|---|---|
| 21 ppm active AA/AHPSE | Complete tube was covered with a deposit | None | Deposits found on sump floor |
| 21 ppm active PMA | Complete tube was covered with a deposit | Very slight | None |
| 11 ppm active PMA and 10 ppm active AA/AHPSE | Isolated areas of very slight deposits on tube | None | None |

Admiralty tubes were used purely for exemplary purposes: other types of metal would also be protected from deposition with the blend. Other sulfonated polymers would also be expected to work in place of AA/AHPSE. For example, the following calcium carbonate beaker tests were completed with other sulfonated polymers:

TABLE 3

| Treatment | Percent Inhibition |
|---|---|
| 12 ppm active PMA and 50 ppm active copolymer of acrylic acid and $CH_2CH(CO)O(CH_2)_3SO_3Na$ | 50.5 |
| 12 ppm active PMA and 50 ppm active AA/AHPSE | 57.7 |
| 12 ppm active PMA and 50 ppm active acrylic acid/allyl hydroxypropyl sulfonate ether copolymer (Polymer B) | 40.7 |
| 12 ppm active PMA and 50 ppm active sulfonated styrene/maleic anhydride copolymer | 39.0 |
| Control (no treatment) | 0.0 |

Note: The proprietary polymers A, B and C tested each have differing mole ratios of acrylic acid to sulfonate ether, and differing molecular weights.

The conditions of this calcium carbonate beaker test were as follows: pH 9, 135° F., 600 ppm Ca as $CaCO_3$, 505 ppm Malk as $CaCO_3$, 18 hour duration. The percent inhibition is calculated as 100 × (ppm Ca of treated—ppm of control solution)/(ppm Ca of stock solution—ppm Ca of control solution).

The effectiveness of a sulfonated polymer in providing improved calcium carbonate deposit control of PMA would not have been expected. For example, polyacrylic acid is also a known calcium carbonate inhibitor. The calcium carbonate inhibiting properties of blends of polyacrylate and ANAHPSE (or similar sulfonated copolymers) are not superior to straight polyacrylate at equal total actives. The following calcium carbonate inhibition data demonstrate this:

TABLE 4

| Treatment | Percent Inhibition |
|---|---|
| 2 ppm active polyacrylic acid | 65 |
| 1 ppm active polyacrylic acid and 1 ppm active Polymer C (acrylic acid/allyl hydroxypropyl sulfonate ether) | 62 |
| Control (no treatment) | 0 |

The conditions of this calcium carbonate beaker test were: pH 9, 70° C., 1102 ppm Ca as $CaCO_3$, 1170 ppm $CO_3$ as $CaCO_3$ and 17 hour duration.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A method for controlling the formation and deposition of scale imparting compounds including calcium carbonate and calcium salts of polymaleic acid in an aqueous system which comprises introducing into said aqueous system an amount sufficient for the purpose of a treatment comprising (a) a sulfonated polymer selected from the group consisting of an acrylic acid/allyl hydroxypropyl sulfonate ether and a sulfonated styrene/maleic anhydride copolymer in an amount effective to inhibit deposition of said calcium salts of polymaleic acid and (b) a polymaleic acid in an amount to inhibit deposition of said calcium carbonate, wherein the pH of the aqueous system is at least about 8.3.

2. The method as recited in claim 1 wherein from about 1–100 ppm of (a) is added to the aqueous system.

3. The method as recited in claim 1 wherein from about 1–100 ppm of polymaleic acid is added to the aqueous system.

4. The method as recited in claim 1 wherein said aqueous system is a cooling water system.

5. The method as recited in claim 1 wherein said aqueous system is a boiler system.

6. The method as recited in claim 1 wherein said aqueous system is a gas scrubbing system.

7. The method as recited in claim 1 wherein said scale imparting compounds further comprise calcium phosphate.

8. The method as recited in claim 1 wherein said scale imparting compounds further comprise calcium sulfate.

* * * * *